US007246569B2

(12) United States Patent
Grandy et al.

(10) Patent No.: US 7,246,569 B2
(45) Date of Patent: Jul. 24, 2007

(54) ELECTRONIC PREDATOR REPLICA

(75) Inventors: Jan L. Grandy, Waco, TX (US); Richard M. Grandy, Woodway, TX (US)

(73) Assignee: Easy Gardener Products, Inc., Waco, TX (US)

( * ) Notice: Subject to any disclaimer, the term of this patent is extended or adjusted under 35 U.S.C. 154(b) by 0 days.

(21) Appl. No.: 11/297,161

(22) Filed: Dec. 7, 2005

(65) Prior Publication Data

US 2007/0125294 A1    Jun. 7, 2007

(51) Int. Cl.
*A01M 29/00* (2006.01)
(52) U.S. Cl. .................... 116/22 A; 340/573.2
(58) Field of Classification Search ........... 116/22 A; 340/573.2; 446/384; 40/411, 412, 414, 40/417, 439, 440; 43/3; D11/162; D21/606
See application file for complete search history.

(56) References Cited

U.S. PATENT DOCUMENTS

| 278,461 A | 5/1883 | Screven |
| 954,288 A | 4/1910 | Holloway |
| 1,066,045 A | 7/1913 | Pass |
| 1,167,502 A | 1/1916 | Huffman et al. |
| D50,230 S | 1/1917 | Cady |
| 1,286,380 A | 12/1918 | Matthews |
| 1,287,968 A | 12/1918 | Greenleaf |
| D54,456 S | 2/1920 | Rush |
| 2,196,078 A | 4/1940 | Pearce |
| 2,545,801 A | 3/1951 | Wrazen |
| 2,575,252 A | 11/1951 | Berger |
| 2,689,431 A | 9/1954 | Beebe |
| 2,722,195 A | 11/1955 | Rockafeller |
| 3,085,545 A | 4/1963 | Ore |
| 3,290,817 A | 12/1966 | Kravath |
| D214,278 S | 5/1969 | Thompson |
| 3,487,569 A | 1/1970 | Mendall |
| 3,526,991 A | 9/1970 | Goldfarb et al. |
| 3,540,150 A | 11/1970 | Kosicki et al. |
| 3,566,535 A | 3/1971 | Handler et al. |

(Continued)

FOREIGN PATENT DOCUMENTS

| GB | 2282518 A | * | 4/1995 |
| JP | 63317037 A | * | 12/1988 |
| JP | 06292495 A | * | 10/1994 |
| JP | 2002078440 A | * | 3/2002 |
| WO | WO 2003059058 A | * | 7/2003 |

OTHER PUBLICATIONS

"Motion Activated Owl", dated Feb. 3, 2004, from the website of Burgess, p. 1 of 1 as printed from the Internet Archive Wayback Machine on Nov. 11, 2006.*
"Motion Activated Owl Bird Deterrent", dated Aug. 5, 2004, from the website nobirds of Motion Scarecrows inc., item No. 101 on p. 1 as printed from the Internet Archive Wayback Machine on Nov. 9, 2006.*
Motion Scarecrows, Inc., Stop Bird Problems, http://www.nobirds.com/products.html, Printed From Internet Dec. 5, 2005; 2 pgs.

*Primary Examiner*—R. Alexander Smith
(74) *Attorney, Agent, or Firm*—O'Keefe, Egan, Peterman, Enders & LLP

(57) ABSTRACT

An electronic predator replica is disclosed for controlling pests, particularly unwanted birds, in a specific area. The predator replica may be an electronic owl. The replica senses motion by one or more of a plurality of spaced motion sensors, and the predator head rotates to the angle of the sensor that sensed the motion. A noise device in the predator may simulate predator sounds, and can be set to play when motion is detected. The owl head may stay at the angle from which motion is detected for a selected time period, and then rotate in opposite direction to its starting point.

25 Claims, 3 Drawing Sheets

U.S. PATENT DOCUMENTS

| | | |
|---|---|---|
| 3,735,514 A | 5/1973 | Asder |
| 3,818,630 A | 6/1974 | May |
| 4,038,639 A | 7/1977 | Kuebler |
| 4,131,079 A | 12/1978 | Rousseau, Jr. et al. |
| 4,239,825 A | 12/1980 | Kaulfuss et al. |
| 4,597,357 A | 7/1986 | LeMessurier |
| 4,734,074 A * | 3/1988 | Kinberg et al. ............ 446/184 |
| 4,893,428 A | 1/1990 | Gagnon, Sr. |
| 5,112,265 A | 5/1992 | Naum |
| 5,274,942 A | 1/1994 | Lanius |
| 5,289,654 A | 3/1994 | Denny et al. |
| 5,450,063 A * | 9/1995 | Peterson et al. ......... 340/573.2 |
| D366,451 S | 1/1996 | Farstad |
| 5,892,446 A * | 4/1999 | Reich ........................... 111/67 |
| 5,901,491 A | 5/1999 | Caldwell |
| 5,966,075 A * | 10/1999 | Blanks ..................... 340/573.2 |
| 6,092,322 A | 7/2000 | Samaras |
| 6,149,490 A * | 11/2000 | Hampton et al. ............ 446/353 |
| 6,407,670 B1 * | 6/2002 | Dysarsz et al. ........... 340/573.2 |
| 6,575,597 B1 * | 6/2003 | Cramer et al. ............... 362/259 |
| 7,025,655 B2 | 4/2006 | Chase |
| 2004/0116042 A1 | 6/2004 | Emoff |
| 2006/0119482 A1 * | 6/2006 | Hanscom .................. 340/573.1 |

* cited by examiner

ELECTRONIC PREDATOR REPLICA

CROSS-REFERENCE TO RELATED APPLICATIONS

This application hereby expressly incorporates by reference as if fully set forth herein copending, concurrently filed U.S. patent application Ser. No. 11/296,982, filed on Dec. 7, 2005, entitled "Owl With Spring Connected Head and Wind Activated Fin" by Jan L. Grandy.

TECHNICAL FIELD OF THE INVENTION

This invention relates to predator replica designed to control pests, particularly unwanted birds that may destroy gardens, nest in gutters or parts of a structure, leave guano or various messes behind, etc.

BACKGROUND

Certain predator replicas, such as electronic owls, are used for controlling pests within a specific area, particularly unwanted birds that may destroy gardens, nest in gutters or parts of a structure, i.e. air conditioner vents, leave guano or various messes behind, etc. Current owl replicas are either stationary with no moving parts or have limited head movement, i.e. head rotation only. Known in the art are owl replicas having a body and head that generally correspond to the shape of a live owl, wherein the head is connected to the body by an unstable mount to allow for movement of the head. Some owl replicas comprise arms that move or open electronically. Other electronic owls are known in the art, for example, to have four sensors that detect motion occurring around electronic owl. The four motion sensors may be placed in an owl base similar as shown with respect to the electronic owl shown in FIG. 1. In an effort to resemble a live owl such as a great horned owl, the owl may include coloring, body, and feather contours of a live owl. Other features of the prior art owl include two feet, two eyes, a beak, and two ear tufts that protrude on top of head. In such a prior art motion detecting electronic owl, four motion sensors 18 detect motion in the vicinity of the owl. When motion is detected by any of the motion sensors 18, the head of the owl is electro-mechanically rotated continuously in a 360 degree motion such that it starts and comes to rest at the some point. Such movement is independent of which motion sensor detected motion. Such an electronic owl was marketed by Motion Scarecrows of Ventura, Calif.

SUMMARY OF THE INVENTION

The present invention provides an electronic predator replica, such as an owl, having a plurality of sensors, with means for rotating a predator head through any angle within 360 degrees to the direction of a particular sensor that senses motion. Once the head reaches the direction of the sensor that senses motion, the head holds its position at the sensor for some time period (for example 10 seconds) before returning to is starting position. In one embodiment the starting position is offset from any sensor. The electronic predator head either rotates clockwise or counterclockwise to a sensor detecting motion depending upon the head starting position and the location of the sensor detecting motion. If the starting position of the head is less than 45 degrees from a sensor detecting motion, the head may move to the activating sensor in a direction that increases movement of head instead of rotating directly to the sensor. For example, the head may bypass the activating sensor, rotate to the next sensor, then return to the activating sensor, hold its position at the activating sensor for a selected period of time, i.e. ten seconds, then return to the starting position. The electronic predator may further comprise a noise device that simulates predator sounds. The noise device can be activated when motion is detected by one of the sensors. The noise device can create noise when head is at the angle of the activating sensor, and/or during rotation of head.

The electronic owl of the present invention departs from the conventional concepts and designs of the current art, and in doing so, provides an apparatus primarily developed for the purpose of deterring pests, particularly unwanted birds, from a specific area, by rotating a head in the direction of movement, i.e. an unwanted bird's movement, holding its position in the direction from which motion was sensed for a selected period of time, then returning to its starting position.

As described below, other features and variations can be implemented, if desired, and a related method can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Figure 1:
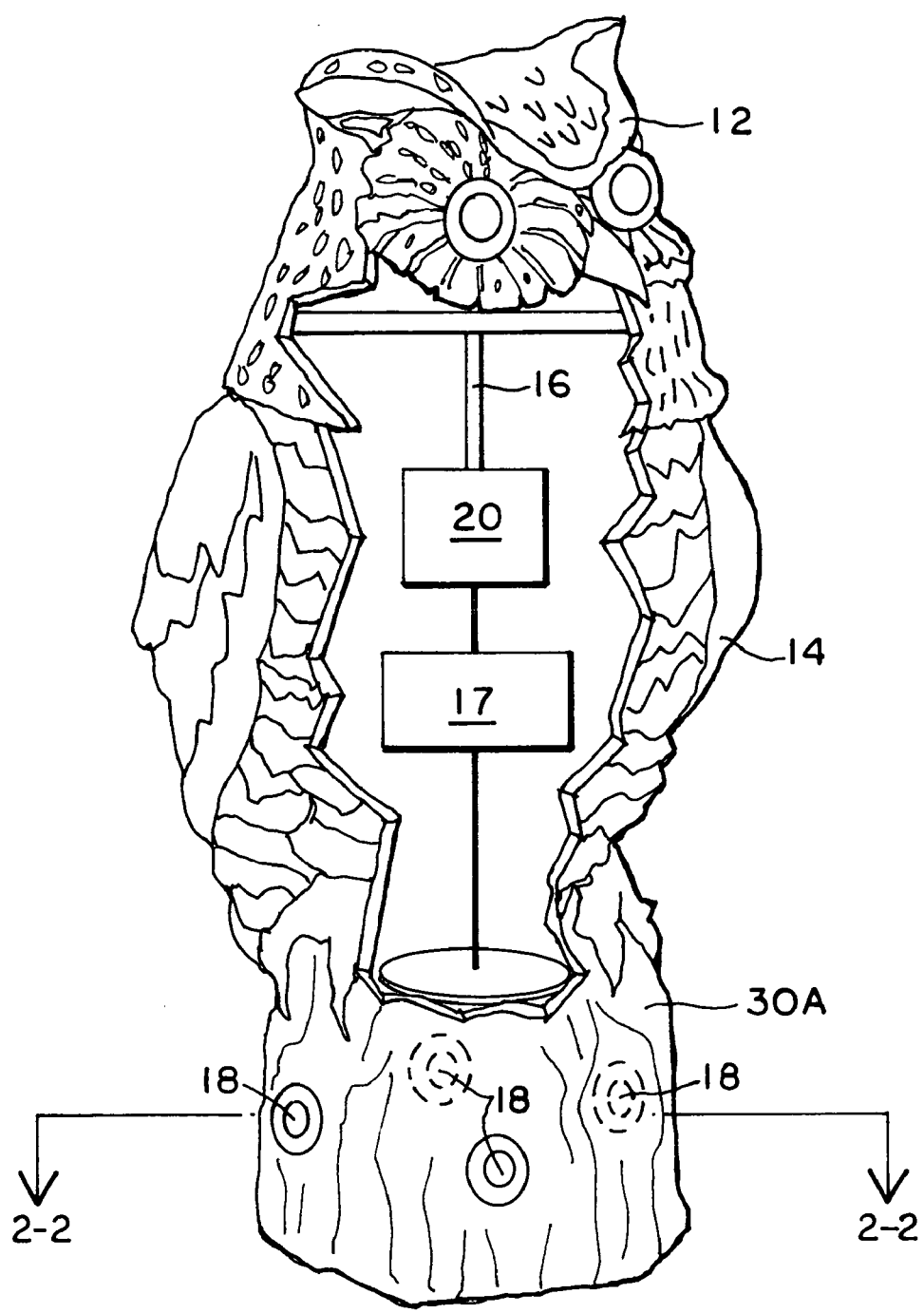
FIG. 1 shows a frontal view of a prior art predator replica.

Referring to the drawings, the owl body of the present invention is similar in structure and appearance to the prior art predator replica shown in FIG. 1. However, the electrical control and movement of the owl of the present invention provides significant improvements over the prior art. The owl of the present invention provides an electronic owl having means for rotating the owl head through a plurality of angles, a plurality of spaced motion sensors, and means responsive to a sensing of motion by one of the sensors for rotating the head at least to the angle of the sensor which detects motion.

FIG. 1 shows a frontal view of the electronic owl of the present invention wherein the head 12 is attached to the body 14 via a drive mechanism 16 that is connected to an electronic motor mechanism 20 that rotates the head 12 when activated by one of the sensors 18. The body 14 and the head 12 may be formed of molded plastic and may be hollow. The body 14 and the head 12 may be formed as separate units so as to allow the head 12 to rotate with respect to the body 14. Four motion sensors 18 may be provided as shown in a base 30 (two sensors shown as dashed lines in the figure are located on the exterior of the backside of the base, into the page in the figure) The electronic motor mechanism 20, while shown housed in the body 14, could alternatively be housed within the head 12 of the owl or the base 30. The electronic motor mechanism 20 can include a motor mechanism and associated electronic controls with a drive for rotating the drive mechanism and a head from a starting position to a particular sensor 18 sensing motion, stopping the head at the sensor 18, and returning the head to its starting position. Electronic control circuitry 17 may couple the motion sensors 18 and the motor mechanism 20 and provide the necessary control signals to the motor mechanism 17 so as to control the motor and drive mechanism in the desired manner.

In an effort to resemble a live owl such as for example a great horned owl, the electronic owl may include coloring, body, and feather contours of a live owl. Other possible features of the owl include two feet, two eyes, a beak, and two ear tufts that protrude on top of head 12. Any variety of aesthetic features may be utilized to more closely resemble an actual owl, however, as will be recognized from the disclosure herein the concepts described herein may be utilized without some or all of such aesthetic features.

Figure 2:
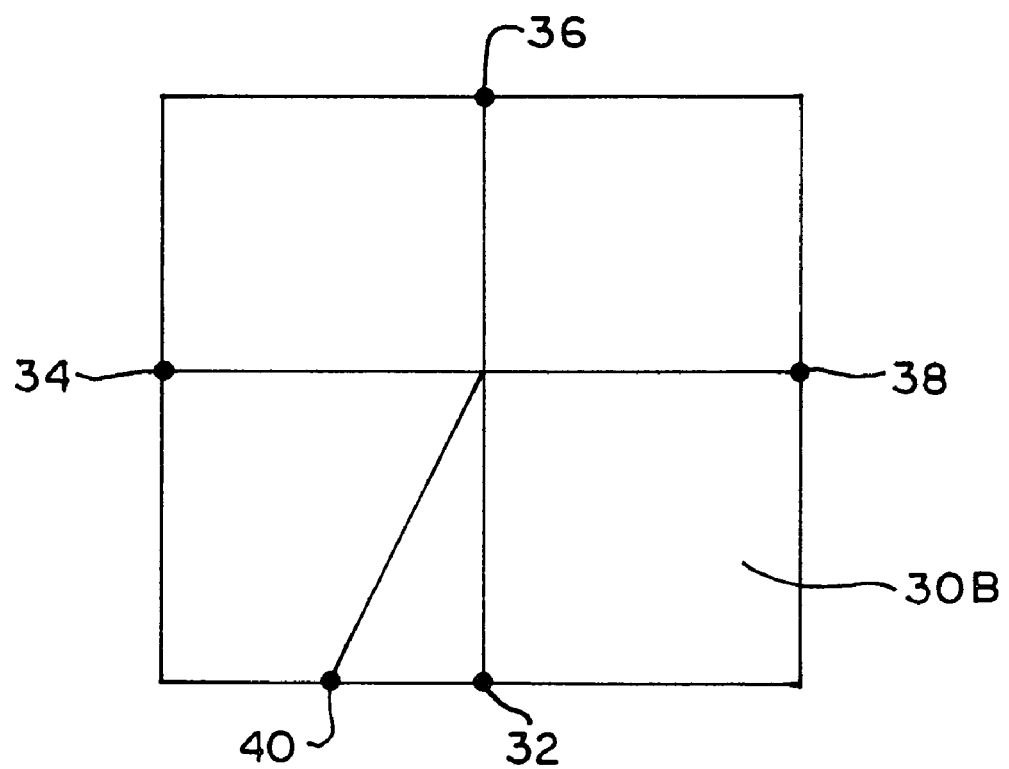
FIG. 2 shows a cross-section of a base of an electronic owl of the present invention containing spaced sensors and a starting position for owl head.

FIG. 2 shows a cross-section of the base 30 of FIG. 1 through sections line 2-2 of FIG. 1. While the body of the present invention may utilize the structure shown in FIG. 1, the present invention comprises a motion detecting system, as operationally described in FIG. 2, that when activated, results in the head of the electronic owl rotating to an angle of a sensor sensing motion, stopping at the sensor, and returning to its original starting position. The owl head of the disclosed herein may rotate either clockwise or counterclockwise to a sensor sensing motion, depending on the sensor to which it is rotating. After stopping for a selected period of time at the activating sensor, the owl head rotates in an opposite direction to return to its original starting position, which is not at an angle of a sensor.

FIG. 2 discloses a one embodiment of the concepts provided herein. However, it will be recognized that the techniques disclosed herein may be utilized with other embodiments. As shown in FIG. 2 a cross-section of a base 30 of the owl is provided. Four motion detecting sensors 32, 34, 36, and 38 are mounted on the base 30 and spaced at 90 degree intervals within a 360 degree rotation. An owl head starting position 40 is also provided. This is the position at which the owl head normally resides. In the example shown, the starting position of the head is not at a motion detecting sensor location. However, the techniques described herein are not limited to such a starting position. While FIG. 2 shows an electronic owl having four sensors, it is understood that the concepts described herein may be utilized with more or less than four motion detecting sensors.

In a one embodiment, when motion is detected by Sensor 34, Sensor 36, or Sensor 38, the owl head rotates clockwise to the sensor detecting motion, holds its position at that sensor location for a selected time period, for example ten seconds, then rotates counterclockwise to starting position 40. When motion is detected by Sensor 32, the owl head rotates counterclockwise from starting point 40 past Sensor 32 to Sensor 38, then rotates clockwise to Sensor 32, holds its position at Sensor 32 for ten seconds, then rotates clockwise to starting position 40. The head bypasses Sensor 32 before returning to Sensor 32 when motion is detected by Sensor 32 because the distance from starting position 40 to Sensor 32 is too short and does not allow for enough head movement or rotation for effective intimidation of unwanted birds. In other embodiments of the invention having more than four sensors, head rotation may be configured the same as described herein with a particular sensor having a close distance between sensor and starting position (for example less than 45 degrees) such that for some sensors detecting motion the head does not move directly to the location of motion following the shortest path of movement. More than one sensor may be set to be bypassed before head returns to sensor that detected motion. In an alternative embodiment, for sensors that are closely located to the starting head position the head may merely rotate in the clockwise or counterclockwise direction that results in more movement. For example, with regard to FIG. 2 when motion is detected by Sensor 32 the head may rotate clockwise from starting position 40 to the location of Sensor 32, hold at that position for some time period and rotate back to position 40 either directly by moving clockwise from Sensor 32 to position 40 or more indirectly by rotating counterclockwise.

Figure 3:
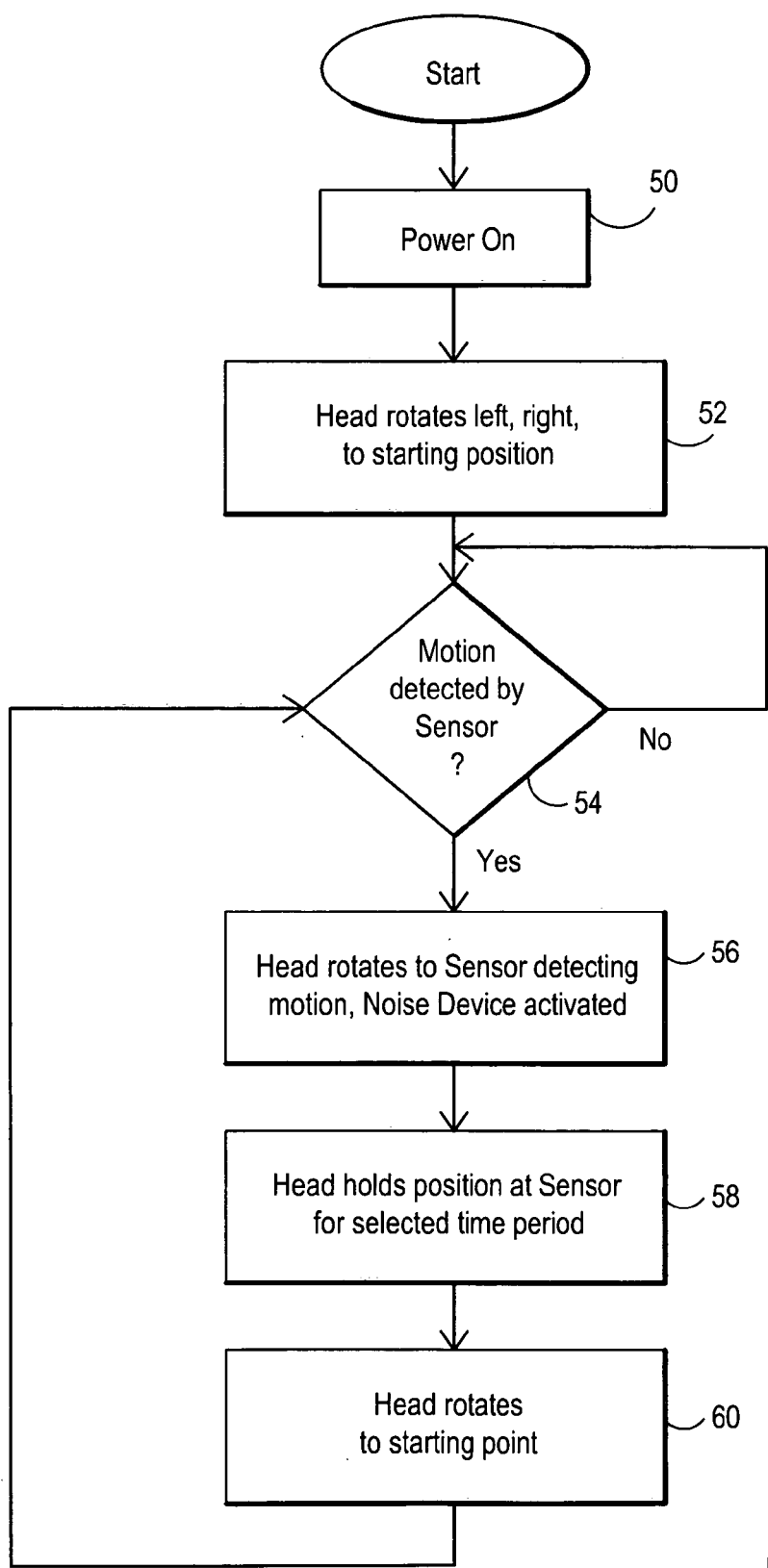
FIG. 3 is an illustrative flowchart describing functions of the present invention.

FIG. 3 is a flowchart showing the steps involved in the operation of the present invention. In one embodiment of the invention, the electronic owl is powered on in step 50. Once powered on, the owl head rotates left, then right, then back to its starting position in step 52. At this point in time the owl is awaiting a detection of motion by one of the motion sensors. A determination is made regarding whether motion is detected by a sensor in step 54. If NO, the process returns to step 54 until motion is detected. If YES, motion is detected, then the owl head rotates to sensor detecting motion (as described below a noise device may optionally be activated at this time) resulting in rotation in step 56. If a sensor detecting motion is ample distance from head's starting point, which is not at a sensor, the head may rotate directly to the activated sensor. However, if the sensor detecting motion is close to starting point, the head can be set to bypass the sensor and rotate to next sensor before returning to the activated sensor or rotate indirectly to the activated sensor. Depending upon placement of the sensors in relation to the starting point, initial rotation of the head can be clockwise or counterclockwise with return rotation of head to starting point in opposite direction. Once the head reaches the activated sensor, the head holds a position at the location of the activated sensor for a selected time period in step 58. In one example the head is held for ten seconds however the holding time may be set to more or less time. The head may then rotate to the starting point in step 60, such as for example by rotating in the opposite direction of initial rotation to the activated sensor. The process continues back to step 54 for further motion detection.

It will be recognized that the specific implementation details of an electronic predator replica may be varied while still utilizing the advantageous techniques described herein. For example, the particular movements of the owl head described herein are exemplary. For example, when detecting motion the owl head may move and pause at a plurality of locations rather than merely at the location that corresponds to the direction of detected motion. For example, the head may move to and pause at a first intermediary location prior to moving to and pausing at the location corresponding to the direction of detected motion (or vice-versa). Further, additional movement and travel distance of the head could be added. Thus, for instance, rather than directly moving to a location of detected motion the head could, for example, move in a complete 360 degree rotation and then move directly to the location of the detected motion. Further, the movements provided herein with regard to counterclockwise and clockwise rotation are exemplary and the opposite movements could occur. In one general embodiment a technique is provided herein such that differentiation is provided between the motion sensors such that some sense of from which direction the detected motion is located can be determined. Then the movement of the owl head may be tailored to such direction. In this manner, at least two different motions of the owl head may be provided for at least two different detected motions. In a broad sense this could be a front detected vs. back detected motion or alternatively a left side vs. right side detected motion. As described above, in another embodiment at least four independent sensors may be utilized. Additional sensors, may however, also be utilized.

As provided above, the head of the owl is located at a starting point that does not correspond with a sensor. In general, the starting point may correspond to the normal resting location of a predator head with relation to the body design; however, the advantages of the techniques described herein may be obtained by using different starting points (or even changing starting points). In addition, though the starting point described above does not correspond to the location of one of the sensors alternative embodiments may be utilized. For example, the starting point and a motion sensor may be at same location. In such case, upon detection of movement at the starting point, the head may be provided with some movement and then return to the starting point. In yet another embodiment, the starting point may randomly vary.

In still another embodiment, the owl head may differentiate which of a plurality of motion sensors detected movement and then move to the location of that motion sensor from a starting point. Rather than merely pausing at the location of detected motion, the head may then stop at the location of detected motion such that the location is now the next starting point for the next event of detected motion.

The physical structure of the predator may be constructed in a wide range of manners. Further, drive motor, drive mechanism and electronics which couple the motion sensors and the drive motor may be constructed in a wide variety of manners. Further, the coupling of the owl head to the owl body may be accomplished in a wide variety of manners. For example, the body and head may be coupled with a drive shaft that only allows for rotational movement in one plane. However, the head and body may be coupled in a manner which allows for additional movement. For example, the owl may include a spring connection between the head and body for creating additional head movement similar, for example, as described with regard to the above mentioned copending, concurrently filed U.S. patent application Ser. No. 11/296,982, filed on Dec. 7, 2005, entitled "Owl With Spring Connected Head and Wind Activated Fin" by Jan L. Grandy.

The electronic predator of the present disclosure may also optionally include a noise device (not shown) within the predator head and/or body. The noise device may initially be de-activated and then the noise device can be activated when motion is detected. The noise device could thus create noise immediately upon detecting motion, during the rotational movement of the predator head and/or when the predator head pauses at the location of detected movement. The noise device may simulate the natural sounds of the particular predator that is being replicated although other sounds may be utilized.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein and certain features of the invention may be utilized independently of the use of other features, all as would be apparent to one skilled in the art after having the benefit of this description of the invention.

What is claimed is:

1. An electronic owl rotatable through a plurality of angles, comprising:
    means for rotating an owl head through the plurality of degrees of angles;
    a plurality of spaced motion sensors;
    means, responsive to a sensing of motion by one of the sensors, for rotating the owl head at least to an angle of the one sensor; and
    means for stopping the head at the angle of the one of the sensors sensing motion.

2. The electronic owl of claim 1, further comprising means for returning the head to its initial position within a selected time period.

3. The electronic owl of claim 2 wherein returning the head to its initial position comprises rotating the head in an opposite direction of the rotating of the head to the angle of the one sensor.

4. The electronic owl of claim 3 wherein the initial position is at an initial position angle other than a sensor angle.

5. The electronic owl of claim 2, further comprising a noise device simulating owl sounds.

6. The electronic owl of claim 5 wherein said noise device is disabled when the electronic owl is powered on.

7. The electronic owl of claim 5 wherein the noise device is activated by when motion is detected.

8. The electronic owl of claim 5 wherein the noise device creates noise during rotation of head.

9. A method for deterring pests using an electronic predator, comprising:
    providing a plurality of spaced motion sensors;
    sensing motion by one or more of the motion sensors, wherein the sensing of motion can differentiate between at least two different directions of sensed motion; and
    rotating the predator head in a rotational movement pattern that is differentiated based upon the at least two different directions of sensed motion.

10. The method of claim 9 further comprising stopping the head at a location of the sensed motion.

11. The method of claim 10 wherein the plurality of motion sensors comprises four or more motion sensors.

12. The method of claim 10 further comprising returning the head to an initial position within a selected time period after stopping the head at a location of the sensed motion.

13. The method of claim 12 wherein the returning the head to its initial position comprises rotating the head in an opposite direction of the rotating of the head to the location of the sensed motion.

14. The method of claim 12 wherein the initial position is at an initial position angle other than a motion sensor angle.

15. The method of claim 12 wherein the plurality of sensors comprises four sensors spaced at 90 degree angles.

16. The method of claim 12, wherein for at least some of the plurality of motion sensors the head rotates directly to the motion sensor detecting motion.

17. The method of claim 16, wherein for the motion sensors located at a position that is less than a minimum angle between the motion sensor and the initial position the head rotates indirectly to the motion sensor detecting motion.

18. The method of claim 9, further comprising a noise device simulating predator sounds.

19. The method of claim 18 wherein the noise device is activated by the sensors when motion is detected.

20. The method of claim 18 wherein the noise device creates noise during the selected time period that the head is at the location of the detected motion.

21. A predator replica for deterring pests, comprising:
a head;
a body;
a drive mechanism coupling the head and the body, the head and the body being rotatable with relation to each other;
a plurality of motion sensors spaced about the predator replica, the motion sensors directed towards at least two different directions to differentiate motion sensed in at least two different directions; and
a control mechanism coupled to the drive mechanism, the control mechanism rotating the head from a starting position to a direction for which motion is sensed, stopping the head at the direction for which motion is sensed, and returning the head to a starting position.

22. The predator replica of claim 21 wherein the plurality of sensors comprises at least four spaced sensors.

23. The predator replica of claim 21, wherein for at least some of the plurality of motion sensors the head rotates directly to the motion sensor detecting motion.

24. The predator replica of claim 23, wherein for the motion sensors located at a position that is less than a minimum angle between the motion sensor and the starting position the head rotates indirectly to the motion sensor detecting motion.

25. The predator replica of claim 21, further comprising a noise device simulating predator sounds.

* * * * *